United States Patent
Tiirola et al.

(10) Patent No.: US 10,321,416 B2
(45) Date of Patent: Jun. 11, 2019

(54) TRANSMISSION POWER CONTROL

(71) Applicant: Nokia Solutions and Networks Oy, Espoo (FI)

(72) Inventors: Esa Tapani Tiirola, Kempele (FI); Timo Erkki Lunttila, Espoo (FI); Kari Juhani Hooli, Oulu (FI); Klaus Hugl, Vienna (AT)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 15/544,759

(22) PCT Filed: Jan. 28, 2015

(86) PCT No.: PCT/EP2015/051696
§ 371 (c)(1),
(2) Date: Jul. 19, 2017

(87) PCT Pub. No.: WO2016/119839
PCT Pub. Date: Aug. 4, 2016

(65) Prior Publication Data
US 2018/0007643 A1  Jan. 4, 2018

(51) Int. Cl.
*H04W 52/36* (2009.01)
*H04W 52/14* (2009.01)
(Continued)

(52) U.S. Cl.
CPC ....... *H04W 52/367* (2013.01); *H04W 52/146* (2013.01); *H04W 52/241* (2013.01); *H04W 52/244* (2013.01); *H04W 52/262* (2013.01)

(58) Field of Classification Search
CPC .............................................. H04W 52/00–60
See application file for complete search history.

(56) References Cited

U.S. PATENT DOCUMENTS

| | | | |
|---|---|---|---|
| 2011/0319120 A1* | 12/2011 | Chen | H04W 52/367 455/522 |
| 2013/0115997 A1* | 5/2013 | Immonen | H04W 52/367 455/522 |

(Continued)

FOREIGN PATENT DOCUMENTS

EP     2757850 A1    7/2014

OTHER PUBLICATIONS

International Search Report and Written Opinion received for corresponding Patent Cooperation Treaty Application No. PCT/EP2015/051696, dated Jan. 28, 2015, 16 pages.

(Continued)

*Primary Examiner* — Raymond S Dean
(74) *Attorney, Agent, or Firm* — Harrington & Smith

(57) ABSTRACT

Apparatuses and methods for transmission power control are disclosed. A given transmission resource and a first transmission power are determined (202, 204) for transmission. Prior to transmitting on the given transmission resource it is determined (206) whether the resource is occupied or unoccupied. Upon detecting that the resource is occupied, a second, reduced transmission power is determined (210) such that a transmission using the second, reduced transmission power would not render the resource as occupied. The determination of the second transmission power is based at least partially on a predetermined maximum transmission power reduction value. Transmission (212) is done utilizing the given transmission resource using the second transmission power according to the determination.

17 Claims, 4 Drawing Sheets

(51) Int. Cl.
H04W 52/24 (2009.01)
H04W 52/26 (2009.01)

(56) References Cited

U.S. PATENT DOCUMENTS

| | | | | |
|---|---|---|---|---|
| 2014/0328270 A1* | 11/2014 | Zhu | ............ | H04W 74/002 |
| | | | | 370/329 |
| 2014/0335855 A1* | 11/2014 | Lee | ............ | H04W 24/10 |
| | | | | 455/426.1 |
| 2015/0049712 A1* | 2/2015 | Chen | ............ | H04W 72/1215 |
| | | | | 370/329 |
| 2015/0245302 A1* | 8/2015 | Lim | ............ | H04W 52/34 |
| | | | | 455/522 |
| 2015/0373652 A1* | 12/2015 | Dabeer | ............ | H04W 52/246 |
| | | | | 455/522 |
| 2016/0100420 A1* | 4/2016 | Chen | ............ | H04W 16/14 |
| | | | | 370/329 |
| 2016/0142920 A1* | 5/2016 | Suzuki | ............ | H04W 16/14 |
| | | | | 370/336 |
| 2017/0048729 A1* | 2/2017 | Jin | ............ | H04W 24/02 |
| 2017/0295046 A1* | 10/2017 | Ahn | ............ | H04W 52/14 |

OTHER PUBLICATIONS

Panasonic: "Regulatory Framework for 5 GHz", 3GPP Draft; RI-144111, 3rd Generation Partnership Project (3GPP), Mobile Competence Centre ; 650, Route Des Lucioles ; F-06921 Sophia-Antipolis Cedex ; France vol. RAN WG1, No. Ljubljana, Slovenia; Oct. 6, 2014-Oct. 10, 2014 Oct. 5, 2014 (Oct. 5, 2014), XP050875396.

* cited by examiner

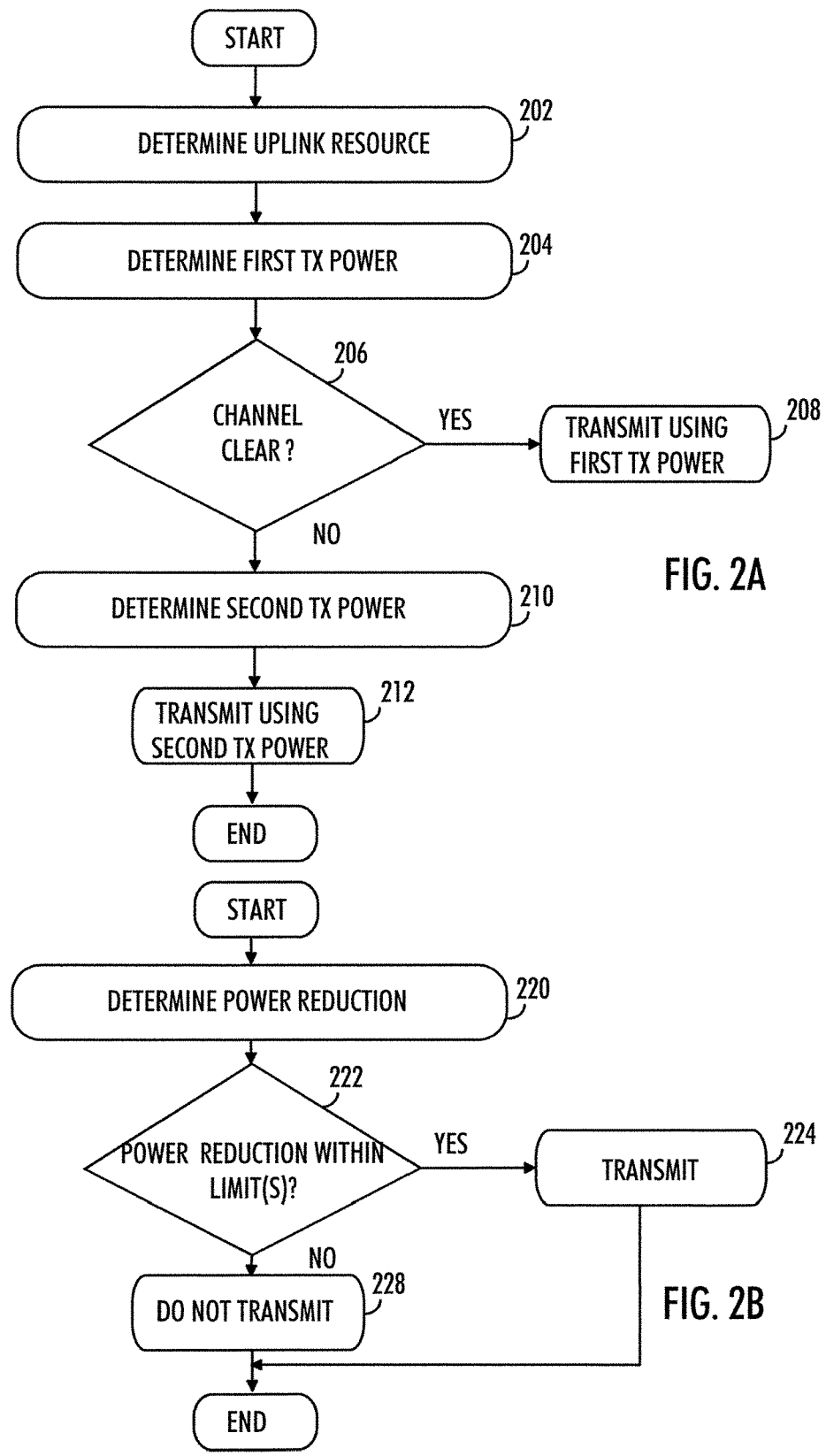

TRANSMISSION POWER CONTROL

RELATED APPLICATION

This application was originally filed as PCT Application No. PCT/EP2015/051696 filed Jan. 28, 2015.

TECHNICAL FIELD

The exemplary and non-limiting embodiments of the invention relate generally to communications.

BACKGROUND

The following description of background art may include insights, discoveries, understandings or disclosures, or associations together with disclosures not known to the relevant art prior to the present invention but provided by the invention. Some of such contributions of the invention may be specifically pointed out below, whereas other such contributions of the invention will be apparent from their context.

With the ever increasing demand for increasing data rates and higher quality services in the world of mobile communications comes ever increasing demand for better performance of cellular network infrastructures. The available frequency resources are limited and need for efficient use of the resources is essential.

It may be difficult to improve spectrum efficiency using traditional solutions. Thus, operators, network and device manufacturers and other players in the field are considering the utilization of unlicensed frequency bands along with costly licensed spectrum. The unlicensed frequency bands are only lightly regulated; users do not need licenses to exploit them. Recently the coexistence of cellular systems such as LTE (long term evolution) along with other radio technologies such as Wi-Fi has been investigated. The purpose is to find a solution which enhances LTE to enable access to unlicensed spectrum while coexisting with other technologies and fulfilling the regulatory requirements.

BRIEF DESCRIPTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to a more detailed description that is presented later.

According to an aspect of the present invention, there is provided an apparatus caused to determine a given transmission resource for transmission, a first transmission power level and, prior to transmitting on the given transmission resource, whether the resource is occupied or unoccupied.

Upon detecting that the resource is occupied, the apparatus is caused to determine a second, reduced transmission power by applying a transmission power reduction such that a transmission using the second transmission power would not render the resource as occupied, wherein the determination of the second transmission power is based at least partially on a predetermined maximum transmission power reduction value. The apparatus is further caused to transmit utilising the given transmission resource using the second, reduced transmission power according to the determination.

According to an aspect of the present invention, there is provided an apparatus caused to determine a predetermined maximum transmission power reduction value for a user terminal, control transmission of the predetermined maximum transmission power reduction value to the user terminal and to control transmission to the a user terminal of an uplink resource allocation related to a given transmission resource.

Other aspects provide corresponding methods and computer program products.

One or more examples of implementations are set forth in more detail in the accompanying drawings and the description below. Other features will be apparent from the description and drawings, and from the claims.

BRIEF DESCRIPTION OF DRAWINGS

In the following the invention will be described in greater detail by means of preferred embodiments with reference to the accompanying drawings, in which

FIGS. 2A, 2B and 2C are flowcharts illustrating example embodiments of the operation of an apparatus;

DETAILED DESCRIPTION OF SOME EMBODIMENTS

Embodiments are applicable to any base station, user equipment (UE), server, corresponding component, and/or to any communication system or any combination of different communication systems that support required functionality.

The protocols used, the specifications of communication systems, servers and user terminals, especially in wireless communication, develop rapidly. Such development may require extra changes to an embodiment. Therefore, all words and expressions should be interpreted broadly and they are intended to illustrate, not to restrict, embodiments.

Many different radio protocols to be used in communications systems exist. Some examples of different communication systems are the universal mobile telecommunications system (UMTS) radio access network (UTRAN or E-UTRAN), long term evolution (LTE, known also as E-UTRA), long term evolution advanced (LTE-A), Wireless Local Area Network (WLAN) or Wi-Fi based on IEEE 802.11stardard, worldwide interoperability for microwave ac-cess (WiMAX), Bluetooth®, personal communications services (PCS) and systems using ultra-wideband (UWB) technology. IEEE refers to the Institute of Electrical and Electronics Engineers.

Figure 1:
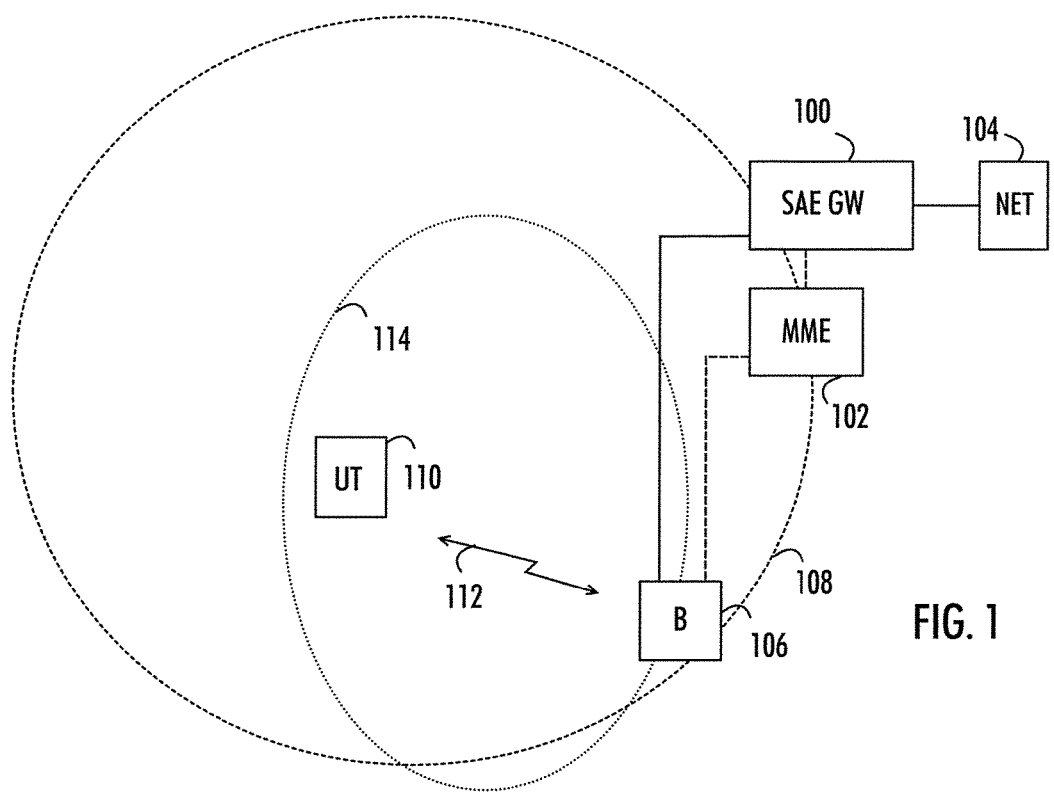
FIG. 1 illustrates an example of a communication environment.

FIG. 1 illustrates a simplified view of a communication environment only showing some elements and functional entities, all being logical units whose implementation may differ from what is shown. The connections shown in FIG. 1 are logical connections; the actual physical connections may be different. It is apparent to a person skilled in the art that the systems also comprise other functions and structures. It should be appreciated that the functions, structures, elements and the protocols used in or for communication are irrelevant to the actual invention. Therefore, they need not to be discussed in more detail here.

In the example of FIG. 1, a radio system based on LTE/SAE (Long Term Evolution/System Architecture Evolution) network elements is shown. However, the embodiments described in these examples are not limited to the LTE/SAE radio systems but can also be implemented in other radio systems.

The simplified example of a network of FIG. 1 comprises a SAE Gateway 100 and an MME 102. The SAE Gateway 100 provides a connection to Internet 104. FIG. 1 shows an eNodeB 106 serving a cell 108 utilising regular LTE spectrum.

In the example of FIG. 1, user terminal UT 110 is connected 112 to the eNodeB 106. In addition to the cell 108 there may be available unlicensed frequency spectrum which is not permanently allocated for LTE use. The eNodeB may be configured to utilise such spectrum. The coverage area 114 of the eNodeB on the unlicensed spectrum may be the same or different compared to the cell 108.

The eNodeBs (Enhanced node Bs) of a communication system may host the functions for Radio Resource Management: Radio Bearer Control, Radio Admission Control, Connection Mobility Control, Dynamic Re-source Allocation (scheduling). The MME 102 (Mobility Management Entity) is responsible for the overall UE control in mobility, session/call and state management with assistance of the eNodeBs through which the UEs connect to the network. The SAE GW 100 is an entity configured to act as a gateway between the network and other parts of communication network such as the Internet for example. The SAE GW may be a combination of two gateways, a serving gateway (S-GW) and a packet data network gateway (P-GW).

User terminal UT (a.k.a. user equipment, UE) may refer to a portable computing device. Such computing devices include wireless mobile communication devices operating with or without a subscriber identification module (SIM), including, but not limited to, the following types of devices: mobile phone, smartphone, personal digital assistant (PDA), tablet computer, laptop computer.

In an embodiment, at least some of the above connections 112 between eNodeB and UT utilise an unlicensed or shared spectrum. This LTE operation on unlicensed spectrum (LTE-U) may also be denoted as Licensed-Assisted Access (LAA). In an embodiment, the user terminal may have simultaneously connections utilising both licensed and unlicensed spectrums. For example, LTE carrier aggregation may be used. In carrier aggregation, more than one carrier may be aggregated to extend the bandwidth available to a user terminal. In an embodiment, some carriers are on licensed spectrum and some on unlicensed spectrum.

Some regulations applying to the usage of shared spectrum require different systems to use the available resources in a fair manner with-out causing excessive interference to other systems using the same resources.

In an embodiment, Clear Channel Assessment (CCA) (which may also be denoted as Listen-Before-Talk (LBT)) is utilised prior to transmission on the unlicensed spectrum. CCA or LBT requires a device to monitor or measure the usage of a given radio frequency or channel for a given time period to ensure the frequency or channel is unoccupied before making the decision whether to transmit on the frequency or channel or not. The CCA or LBT measurement may be, for example an interference power measurement. The requirements for CCA vary depending on the geographic region: e.g. in the US such requirements do not currently exist, whereas in e.g. Europe and Japan the network elements operating on unlicensed bands may need to comply with CCA requirements. The usage and allocation of different frequency bands is a continuing process and CCA may be taken into use or required on frequency bands where it currently is not used. Moreover, CCA might be needed in order to guarantee co-existence with other unlicensed band usage in order to enable e.g. fair co-existence with Wi-Fi also operating on the same spectrum.

Below, embodiments of the invention are described mainly in connection with LTE LAA. However, embodiments are equally applicable in connection with other co-existence scenarios. For example, Licensed Shared Access (LSA) is an example of such a scenario. LSA is spectrum sharing concept enabling access to spectrum that is identified for International Mobile Telecommunications IMT but not cleared for IMT deployment. Focused on bands subject to harmonization and standardized by 3GPP (2.3 GHz in EU & China, 1.7 GHz and 3550-3650 MHz in US). Co-primary sharing is another example. Co-primary sharing refers to spectrum sharing where several primary users (operators) share the spectrum dynamically or semi-statically. The scenario is suitable for small cells at 3.5 GHz, for example. Spectrum sharing between operators will happen if regulators force it and/or operators need it.

In general, it is well understood that unnecessary transmissions on unlicensed carriers need to be kept at minimum level in order to avoid interfering other devices or access point operating on the same carrier frequency. Furthermore, CCA requirements mean that the eNodeBs and UE operating on unlicensed carrier may need to stop transmission from time to time to monitor whether the channel is available, and if not, suspend transmission for the duration of one or more subframes.

In normal (licensed band) LTE operation, the network or eNodeB is configure to control the scheduling of uplink (UL) transmissions, i.e. user terminal transmissions. This may be performed either dynamically via PDCCH/EPDCCH (Physical Downlink Control Channel/Enhanced Physical Downlink Control Channel) UL grants and/or negative acknowledgements on PHICH (Physical HARQ ACK/NACK indicator channel), or semi-statically or semi-persistently using e.g. configuration conveyed via RRC (Radio resource Control) signalling (semi-persistent data, UL control signalling). The user terminals are configured to follow eNodeB's orders directly. In the case of dynamic scheduling of PUSCH (Physical Uplink Shared Channel), there is a predetermined time offset between the subframe in which the eNodeB transmits (and the UT receives) the UL grant/PHICH, and the subframe in which the UT transmits the PUSCH transport block(s) as instructed by the UL grant. In LTE frame structure 1 (i.e. LTE FDD) the offset is always 4 ms (i.e. subframes), while in LTE frame structure 2 (TD-LTE) the offset depends on the UL-DL configuration and the index of the subframe, and can be larger than 4 ms too.

The offset introduces a problem when CCA is used. Although the eNodeB schedules the UL transmission via UL grant, it has at the time of the scheduling (i.e. when it transmits the UL grant to the UE) no idea on whether the user terminal is in fact able to transmit as instructed, or not. This is due to the reason that the user terminal must perform CCA immediately prior to starting the UL transmission, i.e. only after it has received the UL grant.

If the user terminal has to omit transmission due to negative CCA, i.e. the channel has been sensed as occupied, it complicates LTE uplink operation considerably. Firstly, the eNodeB will need to perform blind detection to find out whether the user terminal actually transmitted or not. Even though this detection is not a complicated operation for the eNodeB, the eNodeB still does not know whether the transmission is missing due to a failed CCA, or e.g. because the user terminal missed the transmission of the PDCCH/EPDCCH uplink grant. Having to drop transmission of transmission blocks due to negative CCA has a direct negative impact on uplink data throughput, end user latency, and also downlink overhead due to wasted downlink control resources required for scheduling the uplink and should hence be avoided when possible.

As an alternative to user terminal omitting uplink transmission in the case of negative CCA, the user terminal may wait until the channel is vacant and only then transmit the scheduled transmission. Also this alternative complicates considerably LTE uplink operation. In addition to the blind detection of transmission described above, the eNodeB needs also to detect the timing of actual transmission. Further, in the case that multiple user terminals are scheduled in consecutive subframes on the same Physical Resource Block resources, the eNodeB needs also to detect from which user terminal the received transmission originates. In addition to such new mechanisms, also scheduling is complicated as at the time of scheduling of a subframe n the eNodeB does not know whether PUSCH transmissions for previous subframes (e.g. n−1) will be delayed and still waiting for vacant channel. This would be also a considerable change to the current synchronous HARQ operation applied in LTE uplink.

FIG. 2A is a flowchart illustrating an example embodiment of the operation of an apparatus utilising a channel on an unlicensed spectrum. The apparatus may be a user terminal or a part of a user terminal. The order of the steps below may be changed and steps may be combined.

In step 202, the apparatus is configured to determine a given transmission resource. In an embodiment, when the apparatus is an user terminal or part of a user terminal in an LTE based system, the apparatus receives an uplink grant on PDCCH or PHICH message indicating that a PUSCH resource allocation for an LTE cell has been made for the apparatus by the base station or eNodeB the apparatus is connected to. Alternatively, the resource allocation may be done via higher layer signalling. Generally speaking, the resource allocation may consist of data, control signals and/or reference signals.

In step 204, the apparatus is configured to determine a first transmission power level. The apparatus may determine the first transmission power level according to transmit power control rules and equations applicable also on carriers not applying CCA as well as and parameters given by the eNodeB. This value may be denoted as as TxP_cond.

In step 206, the apparatus is configured to determine prior to transmitting on the given transmission resource whether the resource is occupied or unoccupied, i.e. perform CCA analysis. The apparatus may apply a predetermined CCA threshold level. In one embodiment, the CCA threshold level may be at least partially determined based on the to-be-applied (or intended to be applied) transmission power, such as the first transmission power. The CCA threshold level may be determined based on predefined rules, such as rules defined by ETSI (European Telecommunications Standards Institute) specifications and TxP_cond determined in step 204. According to ETSI rules, CCA threshold level TL may be calculated using the formula:

$$TL = -73 \text{ dBm/MHz} + 23 - PH \qquad (1)$$

Here a 0 dBi receive antenna is assumed and transmit power PH is specified in dBm e.i.r.p. (equivalent isotropically radiated power)), where PH equals TxP_cond.

In an embodiment, the threshold level used in CCA may be determined based on the maximum transmit power of the apparatus transmitter, or it may be a parameter configured by eNodeB. Configuration may be received by the apparatus by means of higher layer signalling, or it may be a value obtained directly from a specification.

If the resource is found to be unoccupied, i.e. the apparatus measures the energy level on the resources to be below the CCA threshold, the apparatus is configured to transmit 208 using the determined transmission resource. The first transmission power level is used in the transmission.

If the resource is found to be occupied, i.e. the apparatus measures energy level on the resource which exceeds the CCA threshold level, the apparatus is configured in step 210, to determine a second, reduced transmission power such that a transmission using the second transmission power would not render the resource as occupied, wherein the determination of the second transmission power is based at least partially on a predetermined maximum transmission power reduction value and transmit in step 212 utilising the given transmission resource using the second reduced transmission power level according to the determination.

FIG. 2B is a flowchart illustrating an example embodiment of the operation of an apparatus. The apparatus may be a user terminal or a part of a user terminal. The order of the steps below may be changed and steps may be combined. The example of FIG. 2B illustrates the determination of the second reduced transmission power.

In step 220, after the resource has been found to be occupied, the apparatus is configured to determine a transmission power reduction. The transmission power reduction, which may be denoted as TxP_backoff, is used in the determination of the second reduced transmission power level value, TxP_cond2. In an embodiment, following applies:

$$TxP\_cond2 = TxP\_cond - TxP\_backoff. \qquad (2)$$

Thus in an embodiment, TxP_backoff is a value facilitating user terminal's power reduction with respect to normal uplink power control operation. In an embodiment, TxP_backoff is determined such that after power reduction (by amount of TxP_backoff) the transmission resource can be regarded as 'unoccupied' in the CCA procedure.

In an embodiment, the determination of TxP_backoff is relative to the CCA threshold level used in step 206. In an embodiment, TxP_backoff is determined based on interference+noise measurement from a CCA measurement slot which is a predetermined time interval fulfilling regulatory requirements for CCA observation time. This parameter may be denoted as $P_{ED\_meas}$ (dBm). Here the value PH (dBm) in the ETSI formula (1) in regulations is interpreted as the instantaneous transmit power, which allows a dynamic adjustment of CCA threshold level TL. Thus, TxP_cond2 can be defined, based on energy detection measurement, in the following way:

$$TxP\_cond2 \ (dBm) = TxP\_cond - TxP\_backoff$$
$$= TxP\_cond - (P_{ED\_meas} - TL_{REF})$$

where TxP_cond thus replaces PH as the maximum transmission power of the transmitter assumed when calculating energy detection threshold level and $TL_{REF}$ corresponds to a given energy detection threshold level (defined e.g. in dBm/MHz) for a transmitter with given instantaneous transmit power TxP_cond. ETSI regulations define these parameters in the following way:

$$TL_{REF} = TL = -73 \text{ dBm/MHz} + 23 - PH \text{ (assuming a 0 dBi antenna).}$$

Hence, according to ETSI parameters, TxP_cond2 can be defined in the following way (when substituting $TL_{REF}$ with −73 dBm/MHz+23−PH, and PH=TxP_cond):

$$TxP\_cond2 \text{ (dBm)} = -73 \text{ dBm/MHz} + 23 - P_{ED\_meas} \quad (3)$$

In general, TxP_cond2 or TxP_backoff determination may be based on the CCA threshold level used in step 206, interference+noise measurement, and potentially, on TxP_cond.

In step 222, the apparatus is configured to compare the determined transmission power reduction level TxP_backoff to a predetermined maximum value TxP_backoff_max. The goal of this parameter may be that PUSCH quality (such as SINR) stays always within predefined minimum level at the receiver end. If TxP_backoff is larger than the predetermined maximum value the uplink transmission will be omitted in step 228.

If the determined transmission power reduction level is within the limit, the apparatus is configured to obtain the second transmission power by reducing the first transmission power level with the determined transmission power reduction level as in equation (2); and transmit in step 224 utilising the given transmission resource using the second transmission power.

In the above example, the transmission power reduction is determined first and the second reduced transmission power is next. However, the second reduced transmission power may also be calculated first and the transmission power reduction is determined after that.

Figure 2C:
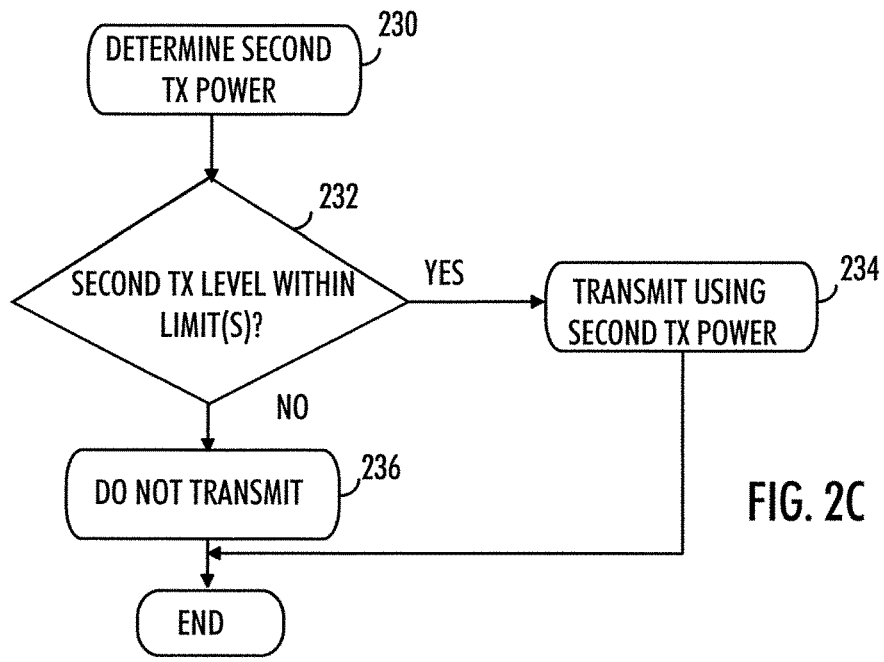

FIG. 2C is a flowchart illustrating another example embodiment of the operation of an apparatus utilising a channel where CCA is applied. The apparatus may be a user terminal or a part of a user terminal.

In step 230 second transmission power is determined for example as described above. If the determined transmission power reduction is within the limit, the apparatus is configured to obtain a second transmission power level by reducing the first transmission power level with the determined transmission power reduction as in equation (2).

In step 232, the apparatus is configured to compare the determined second transmission power TxP_cond2 to a predetermined minimum value TxP_cond2_min. The parameter TxP_cond2_min may be a parameter received from the eNodeB and taken from the set of existing parameters defined for non-CCA operation. If the second transmission power TxP_cond2 is within the limit, i.e. TxP_cond2 is larger or equal to TxP_cond2_min, the apparatus is configured to transmit in step 234 utilising the given transmission resource using the second transmission power.

If the second transmission power level TxP_cond2 is not within the limit, i.e. TxP_cond2 is smaller than TxP_cond2_min, the transmission will be omitted in step 236.

In determining the second transmission power TxP_cond2 in the purpose may generally be to keep other transmission parameters except transmission power level unchanged compared to original PUSCH resource allocation.

In an embodiment, it is also possible that at least some predetermined transmission parameter(s) are autonomously changed by the apparatus when the transmission involves power reduction (i.e. TxP_backoff>0). For example, modulation order and/or coding rate (i.e. the modulation and coding scheme, MCS) may be reduced, which will reduce transport block size accordingly. Alternatively, transport block size may be reduced, which reduces the MCS accordingly. Transmission bandwidth may be reduced. A second transport block may be dropped in the case of spatial multiplexing. In an embodiment, when and how the predefined parameters are or can be changed may be determined by a predetermined set of rules.

In an embodiment, an alternative way for defining TxP_cond2 may be utilised. The apparatus may be configured with a set of fixed TxP_backoff values. In an example embodiment, the apparatus may determine TxP_cond as described above in step 204, as well as set of tentative transmission power levels, TxP_cond2, corresponding for each configured TxP_backoff value.

The apparatus may be configured to determine set of CCA threshold levels TL corresponding to TxP_cond as well as to the set of tentative transmission power values TxP_cond2.

The apparatus may be configured to compare the interference+noise measurement $P_{ED\_meas}$ from a CCA slot against set of TLs, and select the largest TxP_cond or TxP_cond2 value having corresponding CCA threshold level TL>$P_{ED\_meas}$.

The apparatus may transmit PUSCH according to pending uplink grant (i.e. transmission resource allocation and MCS) and with transmission power defined by the selected TxP_cond or TxP_cond2 value if any of the tested CCA threshold levels TL is greater than $P_{ED\_meas}$. Additionally, If TxP_cond2_min has been defined, the following condition needs to be fulfilled: TxP_cond2≥TxP_cond2_min. Otherwise, the transmission will be omitted.

In an embodiment, the transmission power reduction in step 220 is determined by the apparatus prior to determining whether the given transmission resource is occupied or unoccupied in step 206. For example, the apparatus may be configured to determine a tentative maximum transmission power before the actual energy measurement related to CCA. This may take place, for example, one CCA measurement slot before the CCA. Let us for simplicity denote the maximum transmission power determined prior to the energy detection of step 206 as TxP_cond3, although it may be seen as one embodiment of TxP_cond2.

The apparatus may be configured to transmit PUSCH according to pending uplink transmission resource allocation and with transmission power defined by TxP_cond3 if the transmission resource used in CCA is found unoccupied assuming TxP_cond3 is used (CCA may be configured to use TL based on TxP_cond3) and TxP_backoff≤TxP_backoff_max, and (in the case TxP_cond2_min has been defined)

TxP_cond3≥TxP_cond2_min.

Otherwise, transmission will be omitted.

It can be estimated that interference scenario would not change considerably between measurement defining TxP_cond3 and measurement used in CCA. That would ensure that probability for dropping the transmission would be quite small.

In an embodiment, the apparatus is configured to signal to the base station or eNodeB information on the determined power level used. eNodeBs do not have full knowledge about the absolute transmission power level used by user terminals. Hence, certain uplink scheduling results in transmission power reduction at the user terminal side also in current LTE systems. However, it may be beneficial for the base station or eNodeB to receive explicit indication when transmission power is reduced.

In an embodiment, the apparatus may convey at least one signal indicative of use of power reduction (or determined TxP_backoff value or equivalently the value of TxP_cond2) to the eNodeB. Existing signalling channels/formats (such as Scheduling Request SR, HARQ-ACK, Channel State Information CSI, PUSCH data, Demodulation Reference Signal DMRS, Sounding Reference Signal SRS as well as PUCCH formats 1, 1a/b, 2/2a/2b, 3) can be applied. The eNodeB may utilize this information for example for determining the transmission format applied by the apparatus (for the packets corresponding to current CCA measurement, for example) and/or determining the power control parameters signalled to UE (for the coming packets, for example).

In an LTE based system where carrier aggregation is used both primary serving cell PCell and secondary serving cell SCell can be used for conveying the signal.

In an embodiment, the UT may perform carrier aggregation such that the UT transmits user data on a carrier applying clear channel assessment—procedure (e.g. on the unlicensed band/spectrum/channel), and transmits user data and control data on a carrier not applying the clear channel assessment—procedure (e.g. on the licensed band/spectrum/channel).

The apparatus may signal the indication via a licensed carrier, which is not subject to CCA operation, if such a carrier is available. In an embodiment, the apparatus may utilise short control signalling (SCS) on the unlicensed band. According to ETSI regulations on operations on unlicensed spectrum, SCS can be transmitted without utilising CCA procedure. The signalling may occur simultaneously with the PUSCH transmission. In this case it may be used for determining the transmission format applied by the apparatus. The signalling may also occur slightly afterwards of the PUSCH transmission. In this case it may be used for determining the power control parameters signalled to UE for the coming packets.

In addition, the apparatus may be configured to indicate e.g. as part of Channel State Information reporting or power headroom reporting the (average) energy detection or alternatively, the (average) maximum transmission power TxP_cond2 based on which the channel would be regarded as unoccupied. This would prevent the eNodeB from unnecessarily commanding the apparatus to increase transmission power. Quite the contrary, the eNodeB could reduce the target power setting of the apparatus (reducing the gap between target power and CCA-adjusted power) together with adopting the allocated bandwidth and/or MCS for future PUSCH scheduling.

Assume an example where in an LTE based system carrier aggregation is used, primary serving cell PCell being on licensed spectrum and secondary serving cell SCell on unlicensed spectrum. When Uplink Control Information UCI is transmitted via PUCCH on primary serving cell PCell (simultaneous transmission of PUCCH on PCell and PUSCH on unlicensed spectrum cell is supported), calculation of TxP_cond and/or TxP_cond2 for a unlicensed spectrum cell may contain another back-off term, MPR (Maximum Power Reduction) due to multicarrier transmission as defined in the LTE carrier aggregation framework.

In an embodiment when multiple PUSCH have been scheduled on parallel LTE unlicensed spectrum cells, the calculation of TxP_cond and TxP_cond2 may be made separately for each cell.

In an embodiment, when Uplink Control Information UCI is multiplexed with PUSCH on LTE unlicensed spectrum cell, an offset value may be used when determining the number of resources to be used for UCI transmission on PUSCH in the case of reduced transmission power.

The present embodiments propose to define certain limits for the transmission power reduction. If power backoff due to CCA is bigger than a predetermined value, then related PUSCH is dropped as the detection probability with too low power would anyhow be close to zero and therefore the transmission would only cause unnecessary interference. By setting the predetermined values the base station or eNodeB is in control of the autonomous transmission power reduction due to CCA. The power reduction may be also switched off completely by configuring a zero value for the TxP_backoff_max, for example.

The eNodeB can impact Block Error Rate BLER operation point by proper MCS setting taking into account also possible assistance signalling from the user terminal.

The eNodeB is also in charge of uplink power control. Optimized power control strategy may be able to minimize the user terminal autonomous transmission power reduction due to CCA taking into account also possible assistance signalling from the user terminal.

Figure 3B:
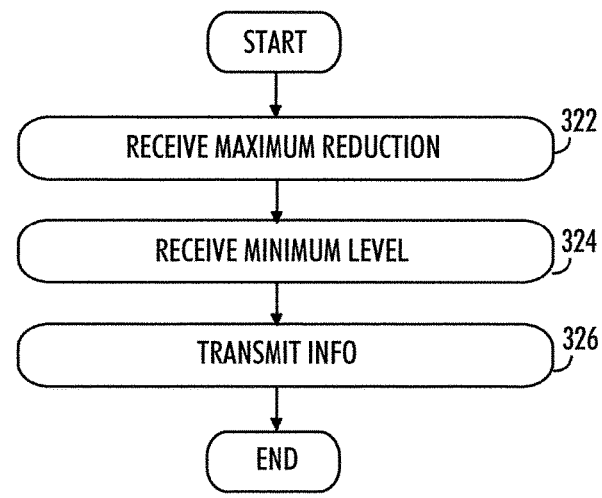
FIGS. 3A and 3b are flowcharts illustrating further example embodiments of the operation of an apparatus.
Figure 3A:
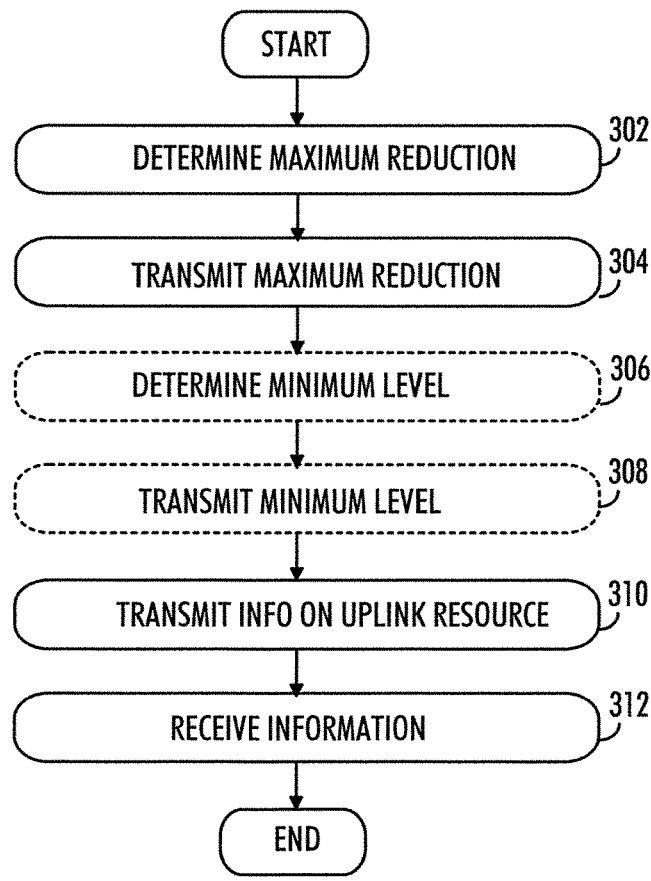

FIG. 3A is a flowchart illustrating an example embodiment. The flowchart illustrates an example of the operation of a base station or an eNodeB. The apparatus may be a base station or an eNodeB or a part of a base station or an eNodeB. The order of the steps below may be changed.

In step 302, the apparatus is configured to determine a predetermined maximum value of a transmission power reduction level for a user terminal operating on spectrum utilising CCA. The maximum transmission power reduction may be denoted as TxP_backoff_max. In an embodiment, the eNodeB scheduling, power control and link adaptation strategy may be taken into account when determining maximum transmission power reduction.

In step 304, the apparatus is configured to control transmission of the predetermined maximum value to the user terminal. The value may be signalled to the user terminal using higher layer signalling such as Radio Resource Control (RRC) signalling or in connection with uplink grant, for example.

In an embodiment, in step 306, the apparatus is configured to determine a predetermined minimum value of user terminal transmission power level TxP_cond2_min. The value may be taken from the set of existing parameters defined for non-CCA operation, for example.

In an embodiment, in step 308, the apparatus is configured to control transmission of the predetermined minimum value to the user terminal. The value may be signalled to the user terminal using higher layer signalling such as Radio Resource Control (RRC) signalling or in connection with uplink grant, for example.

In step 310, the apparatus is configured to control transmission to a user terminal of an uplink grant related to a given transmission resource on an unlicensed spectrum.

In step 312, the apparatus is configured to receive from the user terminal information on the power level used in the transmission utilising the given transmission resource.

FIG. 3B is another flowchart illustrating an example embodiment of the operation of an apparatus. The apparatus may be a user terminal or a part of a user terminal.

In step 322, the apparatus is configured to control reception of the predetermined maximum value from the network. The value may be received using higher layer signalling such as Radio Resource Control (RRC) signalling or in connection with uplink grant, for example.

In step 324, the apparatus is configured to control reception of the predetermined minimum value from the network.

The value may be received using higher layer signalling such as Radio Resource Control (RRC) signalling or in connection with uplink grant, for example.

In step 326, the apparatus is configured to transmit to the network information on the power level used in the transmission utilising the given transmission resource.

Embodiments of the invention help maximizing the probability of being able to transmit PUSCH on an unlicensed spectrum carrier after receiving an uplink scheduling grant. Although user terminal apparatus has some autonomous flexibility in uplink power control, the eNodeB or network network is still setting the limits where the user terminal apparatus is able to operate (by setting TxP_backoff_max and/or TxP_cond2_min) and therefore stay in control. Due to the user terminal apparatus feedback operation of the maximum average applicable power (through feedback of average TxP_backoff and/or TxP_cond2), the eNodeB will be able to adjust its power control commands as well as uplink scheduling and link adaptation decisions.

Figure 4A:
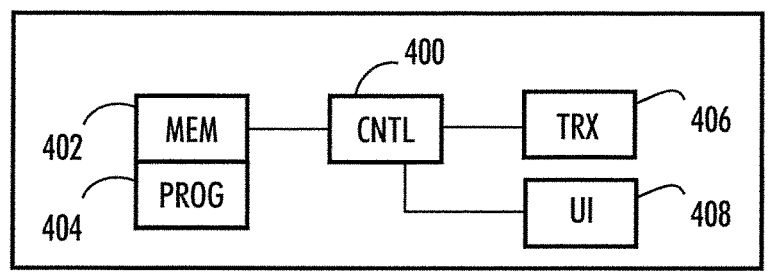
FIGS. 4A, 4B and 5 illustrate simplified examples of apparatuses in which some embodiments of the invention may be applied.

FIG. 4A illustrates an embodiment. The figure illustrates a simplified example of an apparatus applying embodiments of the invention. In some embodiments, the apparatus may be a user terminal or a part of a user terminal of a communications system.

It should be understood that the apparatus is depicted herein as an example illustrating some embodiments. It is apparent to a person skilled in the art that the apparatus may also comprise other functions and/or structures and not all described functions and structures are required. Although the apparatus has been depicted as one entity, different modules and memory may be implemented in one or more physical or logical entities.

The apparatus of the example includes a control circuitry 400 configured to control at least part of the operation of the apparatus.

The apparatus may comprise a memory 402 for storing data. Furthermore the memory may store software 404 executable by the control circuitry 400. The memory may be integrated in the control circuitry.

The apparatus comprises a transceiver 406. The transceiver is operationally connected to the control circuitry 400. It may be connected to an antenna arrangement (not shown).

The software 404 may comprise a computer program comprising program code means adapted to cause the control circuitry 400 of the apparatus to determine a given transmission resource for transmission; determine a first transmission power level; determine prior to transmitting on the given transmission resource whether the resource is occupied or unoccupied; upon detecting that the resource is occupied, determine a second, reduced transmission power such that a transmission using the second transmission power would not render the resource as occupied, wherein the determination of the second transmission power is based at least partially on a predetermined maximum transmission power reduction value; and transmit utilising the given transmission resource using the second reduced transmission power according to the determination.

The apparatus may further comprise user interface 408 operationally connected to the control circuitry 400. The user interface may comprise a display, a keyboard or keypad, a microphone and a speaker, for example.

Figure 4B:
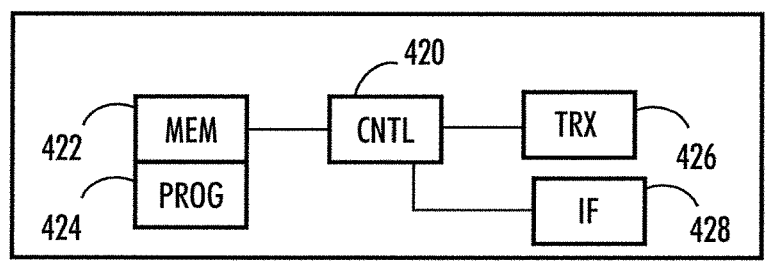

FIG. 4B illustrates an embodiment. The figure illustrates a simplified example of an apparatus applying embodiments of the invention. In some embodiments, the apparatus may be an eNodeB or a base station or a part of an eNodeB or a base station of a communications system.

It should be understood that the apparatus is depicted herein as an example illustrating some embodiments. It is apparent to a person skilled in the art that the apparatus may also comprise other functions and/or structures and not all described functions and structures are required. Although the apparatus has been depicted as one entity, different modules and memory may be implemented in one or more physical or logical entities.

The apparatus of the example includes a control circuitry 420 configured to control at least part of the operation of the apparatus.

The apparatus may comprise a memory 422 for storing data. Furthermore the memory may store software 424 executable by the control circuitry 420. The memory may be integrated in the control circuitry.

The apparatus comprises a transceiver 426. The transceiver is operationally connected to the control circuitry 420. It may be connected to an antenna arrangement (not shown).

The software 424 may comprise a computer program comprising program code means adapted to cause the control circuitry 420 of the apparatus at least to: determine a predetermined maximum transmission power reduction value for a user terminal; control transmission of the predetermined maximum transmission power reduction value to the user terminal; and control transmission to a user terminal of an uplink grant related to a given transmission resource.

The apparatus may further comprise interface circuitry 428 configured to connect the apparatus to other devices and network elements of communication system, for example to core. The interface may provide a wired or wireless connection to the communication network. The apparatus may be in connection with core network elements, eNodeB's, Home NodeB's and with other respective apparatuses of communication systems.

Figure 5:
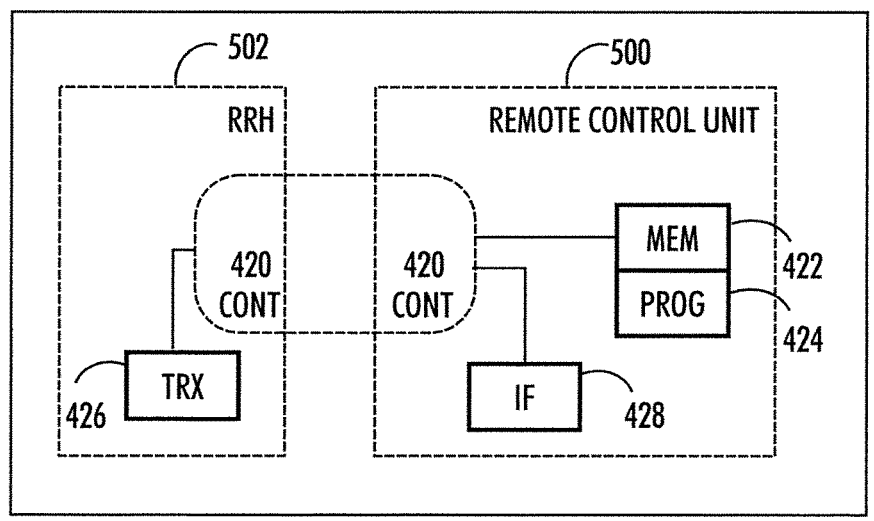

In an embodiment, as shown in FIG. 5, at least some of the functionalities of the apparatus of FIG. 4B may be shared between two physically separate devices, forming one operational entity. Therefore, the apparatus may be seen to depict the operational entity comprising one or more physically separate devices for executing at least some of the described processes. Thus, the apparatus of FIG. 5, utilizing such shared architecture, may comprise a remote control unit RCU 500, such as a host computer or a server computer, operatively coupled (e.g. via a wireless or wired network) to a remote radio head RRH 502 located in the base station. In an embodiment, at least some of the described processes may be performed by the RCU 500. In an embodiment, the execution of at least some of the described processes may be shared among the RRH 502 and the RCU 500.

In an embodiment, the RCU 500 may generate a virtual network through which the RCU 500 communicates with the RRH 502. In general, virtual networking may involve a process of combining hardware and software network resources and network functionality into a single, software-based administrative entity, a virtual network. Network virtualization may involve platform virtualization, often combined with resource virtualization. Network virtualization may be categorized as external virtual networking which combines many networks, or parts of networks, into the server computer or the host computer (e.g. to the RCU). External network virtualization is targeted to optimized network sharing. Another category is internal virtual networking which provides network-like functionality to the software containers on a single system. Virtual networking may also be used for testing the terminal device.

In an embodiment, the virtual network may provide flexible distribution of operations between the RRH and the RCU. In practice, any digital signal processing task may be performed in either the RRH or the RCU and the boundary where the responsibility is shifted between the RRH and the RCU may be selected according to implementation.

The steps and related functions described in the above and attached figures are in no absolute chronological order, and some of the steps may be performed simultaneously or in an order differing from the given one. Other functions can also be executed between the steps or within the steps. Some of the steps can also be left out or replaced with a corresponding step.

The apparatuses or controllers able to perform the above-described steps may be implemented as an electronic digital computer, which may comprise a working memory (RAM), a central processing unit (CPU), and a system clock. The CPU may comprise a set of registers, an arithmetic logic unit, and a controller. The controller is controlled by a sequence of program instructions transferred to the CPU from the RAM. The controller may contain a number of microinstructions for basic operations. The implementation of microinstructions may vary depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions.

As used in this application, the term 'circuitry' refers to all of the following: (a) hardware-only circuit implementations, such as implementations in only analogue and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

An embodiment provides a computer program embodied on a distribution medium, comprising program instructions which, when loaded into an electronic apparatus, are configured to control the apparatus to execute the embodiments described above.

The computer program may be in source code form, object code form, or in some intermediate form, and it may be stored in some sort of carrier, which may be any entity or device capable of carrying the program. Such carriers include a record medium, computer memory, read-only memory, and a software distribution package, for example. Depending on the processing power needed, the computer program may be executed in a single electronic digital computer or it may be distributed amongst a number of computers.

The apparatus may also be implemented as one or more integrated circuits, such as application-specific integrated circuits ASIC. Other hardware embodiments are also feasible, such as a circuit built of separate logic components. A hybrid of these different implementations is also feasible. When selecting the method of implementation, a person skilled in the art will consider the requirements set for the size and power consumption of the apparatus, the necessary processing capacity, production costs, and production volumes, for example.

It will be obvious to a person skilled in the art that, as the technology advances, the inventive concept can be implemented in various ways. The invention and its embodiments are not limited to the examples described above but may vary within the scope of the claims.

The invention claimed is:

1. An apparatus comprising:
   at least one processor; and
   at least one non-transitory memory including computer program code,
   the at least one non-transitory memory and the computer program code configured to, with the at least one processor, cause the apparatus at least to:
   determine a given transmission resource for transmission;
   determine a first transmission power level;
   determine prior to transmitting on the given transmission resource whether the resource is occupied or unoccupied based on a first clear channel assessment procedure having a first clear channel assessment threshold level at least partially defined by the first transmission power level;
   upon detecting that the resource is occupied,
   determine a second reduced transmission power by applying a transmission power reduction such that a transmission using the second reduced transmission power would not render the resource as occupied based on a second clear channel assessment procedure having a second clear channel assessment threshold level at least partially defined by the second reduced transmission power, wherein the determination of the second reduced transmission power is based at least partially on a predetermined maximum transmission power reduction value and on a difference between the first clear channel assessment threshold level of the first clear channel assessment procedure and energy detected during the first clear channel assessment procedure; and
   transmit utilising the given transmission resource using the second reduced transmission power according to the determination.

2. The apparatus of claim 1, wherein the determination of the second reduced transmission power comprises:
   determining the transmission power reduction representing the difference between the first transmission power level and the second reduced transmission power;
   comparing the determined transmission power reduction to the predetermined maximum transmission power reduction value; and
   the at least one non-transitory memory and the computer program code configured to, with the at least one processor, further cause the apparatus at least to:

upon detecting that the determined transmission power reduction is within a limit set by the predetermined maximum transmission power reduction value, perform the transmission; and otherwise omit the transmission.

3. The apparatus of claim 1, wherein the determination of the second reduced transmission power is further based on a predetermined minimum transmission power value.

4. The apparatus of claim 3, wherein the determination of the second reduced transmission power further comprises comparing the second reduced transmission power to a predetermined minimum transmission power value; and the at least one non-transitory memory and the computer program code configured to, with the at least one processor, further cause the apparatus at least to:

transmit utilising the given transmission resource using the second reduced transmission power level if the determined second reduced transmission power level is larger than or equal to the predetermined minimum transmission power value; and otherwise omit the transmission.

5. The apparatus of claim 1, wherein the at least one non-transitory memory and the computer program code configured to, with the at least one processor, cause the apparatus further to:

adjust at least one of the following transmission parameters if transmission uses the second reduced transmission power: modulation order, coding rate, transmission bandwidth, number of transmission blocks to be transmitted.

6. The apparatus of claim 1, wherein the at least one non-transitory memory and the computer program code configured to, with the at least one processor, cause the apparatus further to:

signal, to a network, information on the power level of the transmission and/or on a use of power reduction on the given transmission resource.

7. The apparatus of claim 1, wherein the at least one non-transitory memory and the computer program code configured to, with the at least one processor, cause the apparatus further to:

determine the second reduced transmission power prior to determining whether the given transmission resource is occupied or unoccupied; and check the channel occupancy by assuming transmission with the second reduced transmission power instead of the first transmission power level.

8. The apparatus of claim 1, the at least one non-transitory memory and the computer program code configured to, with the at least one processor, cause the apparatus, further to:

select the transmission power reduction from a set of predetermined transmission power reduction values.

9. The apparatus of claim 1, wherein the at least one non-transitory memory and the computer program code configured to, with the at least one processor, cause the apparatus, further to:

determine more than one given transmission resource for the transmission; and determine the second reduced transmission power separately for each given transmission resource.

10. The apparatus of claim 1, wherein the apparatus is configured to perform carrier aggregation such that the apparatus is configured to transmit user data on a carrier applying clear channel assessment procedure, and is configured to transmit user data and control data on a carrier not applying the clear channel assessment procedure.

11. The apparatus of claim 1, wherein the at least one non-transitory memory and the computer program code configured to, with the at least one processor, cause the apparatus further to:

receive the predetermined maximum transmission power reduction value from a network.

12. The apparatus of claim 3, wherein the at least one non-transitory memory and the computer program code configured to, with the at least one processor, cause the apparatus further to:

receive the predetermined minimum transmission power value from the network.

13. A method comprising:

determining a given transmission resource for transmission;

determining a first transmission power level;

determining prior to transmitting on the given transmission resource whether the resource is occupied or unoccupied based on a first clear channel assessment procedure having a first clear channel assessment threshold level at least partially defined by the first transmission power level;

upon detecting that the resource is occupied, determining a second reduced transmission power by applying a transmission power reduction such that a transmission using the second reduced transmission power would not render the resource as occupied based on a second clear channel assessment procedure having a second clear channel assessment threshold level at least partially defined by the second reduced transmission power, wherein the determination of the second reduced transmission power is based at least partially on a predetermined maximum transmission power reduction value and on a difference between the first clear channel assessment threshold level of the first clear channel assessment procedure and energy detected during the first clear channel assessment procedure; and transmitting utilising the given transmission resource using the second reduced transmission power according to the determination.

14. The method of claim 13, wherein the determination of the second reduced transmission power is further based on a predetermined minimum transmission power value.

15. The method of claim 14, wherein the determination of the second reduced transmission power further comprises comparing the second reduced transmission power to a predetermined minimum transmission power value; and the method further comprises:

transmitting utilising the given transmission resource using the second reduced transmission power if the determined second reduced transmission power is higher than or equal to the predetermined minimum transmission power value; and otherwise omitting the transmission.

16. The method of claim 13, wherein the determination of the second reduced transmission power comprises:

determining the transmission power reduction representing the difference between the first transmission power level and the second reduced transmission power;

comparing the determined transmission power reduction to the predetermined maximum transmission power reduction value; and the method further comprises:

upon detecting that the determined transmission power reduction is within a limit set by the predetermined maximum transmission power reduction value, performing the transmission; and
otherwise omitting the transmission.

17. The method of claim 13, further comprising:
selecting the transmission power reduction from a set of predetermined transmission power reduction values.

\* \* \* \* \*